(12) United States Patent
Zhang et al.

(10) Patent No.: US 8,537,535 B2
(45) Date of Patent: Sep. 17, 2013

(54) DATA STORAGE DEVICE CAGE

(75) Inventors: Yue-Xia Zhang, Wuhan (CN); Jin-Biao Ji, Wuhan (CN); Zhi-Jiang Yao, Wuhan (CN)

(73) Assignees: Hong Fu Jin Precision (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 152 days.

(21) Appl. No.: 13/291,113

(22) Filed: Nov. 8, 2011

(65) Prior Publication Data
US 2013/0070414 A1    Mar. 21, 2013

(30) Foreign Application Priority Data

Sep. 19, 2011   (CN) .......................... 2011 1 0277896

(51) Int. Cl.
*G06F 1/16*  (2006.01)

(52) U.S. Cl.
USPC .................. 361/679.33; 312/222; 369/53.42; 455/456

(58) Field of Classification Search
USPC ............ 361/679.31, 679.33, 679.48, 679.37, 361/679.47, 679.54, 679.55, 679.4, 679.46, 361/679.06, 679.21, 679.38; 312/223.1, 312/223.2, 236, 265.5, 216, 222; 369/75.11, 369/53.42, 84; 455/456.4, 561, 456, 566, 455/556.1, 418; 174/535, 561, 539, 377, 174/383, 384, 359, 50, 60, 64
See application file for complete search history.

(56) References Cited

U.S. PATENT DOCUMENTS

| 7,079,382 B2 * | 7/2006 | Chen et al. | 361/679.39 |
| 2009/0273896 A1 * | 11/2009 | Walker et al. | 361/679.33 |
| 2013/0069503 A1 * | 3/2013 | Hu et al. | 312/223.2 |

* cited by examiner

*Primary Examiner* — Hung Duong
(74) *Attorney, Agent, or Firm* — Altis Law Group, Inc.

(57) ABSTRACT

An exemplary data storage device cage includes a main body and an electrical connector positioned on the main body. The main body includes a rectangular flat plate and two side plates respectively extending upward from opposite edges of the flat plate. The flat plate has at least a pair of tabs opposite to each other. The at least two tabs are respectively contiguous with but offset inward from the two side plates and positioned to cooperatively hold a data storage device therebetween. The electrical connector is positioned between the two side plates for electrically connecting the data storage device to an external device.

20 Claims, 4 Drawing Sheets

DATA STORAGE DEVICE CAGE

BACKGROUND

1. Technical Field

The present disclosure generally relates to mounting brackets for computers, and particularly to a modular cage for mounting a data storage device such as a hard disk drive (HDD) to a computer.

2. Description of the Related Art

Personal computers have become an integral part of most businesses. Due to increasing sales of personal computers, computer manufacturers look for ways to more efficiently mass-produce their products. In order to improve the serviceability of equipment using hard drive drives, it is conventional to mount the hard disk drives in the equipment in a way that allows the hard disk drives to be easily removed from the equipment when needed. Typically, each hard disk drive is mounted in a data storage device cage.

However, conventional data storage devices such as hard disk drives (HDDs) are typically heavy and have a large volume. This can make installation and removal of the data storage devices problematic. In addition, conventional data storage device cages are manufactured by a die casting process. The die casting process requires use of an expensive mold, and the process is complex. This makes manufacturing of the data storage device cages costly.

BRIEF DESCRIPTION OF THE DRAWINGS

Many aspects of the present data storage device cage can be better understood with reference to the following drawings. The components in the drawings are not necessarily drawn to scale, the emphasis instead being placed upon clearly illustrating the principles of the present data storage device cage. Moreover, in the drawings, like reference numerals designate corresponding parts throughout the several views.

DETAILED DESCRIPTION

Embodiments of a data storage device cage are described in detail herein with reference to the drawings.

Figure 1:
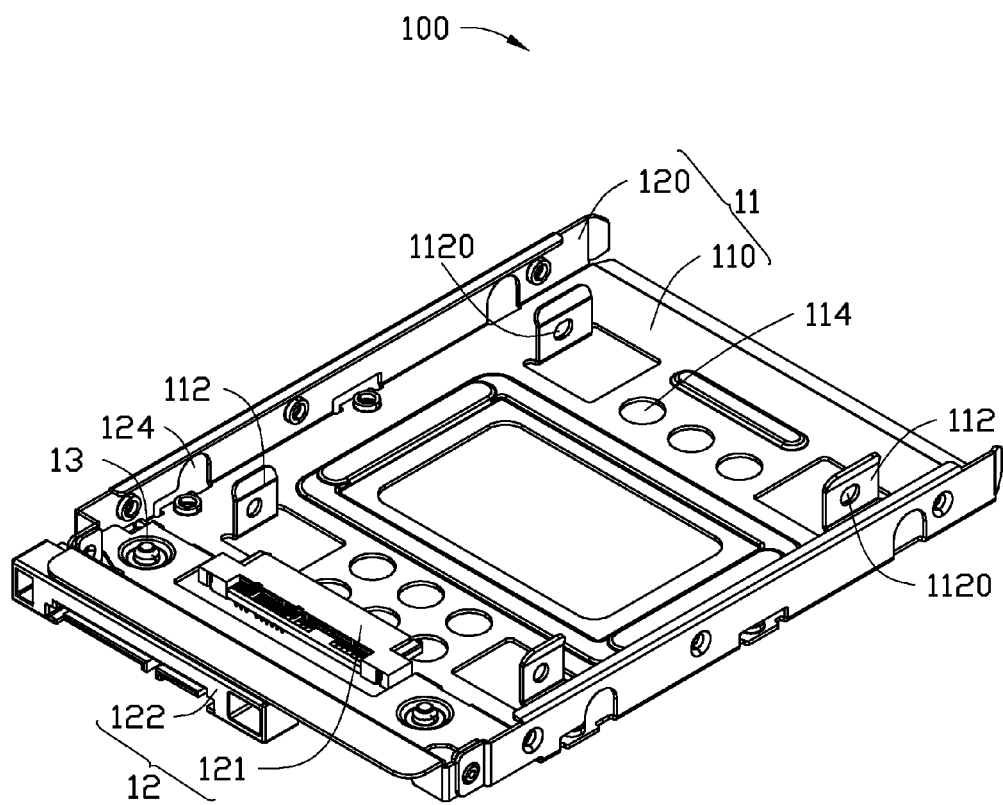
FIG. 1 is an isometric view of a data storage device cage in accordance with an embodiment.
Figure 2:
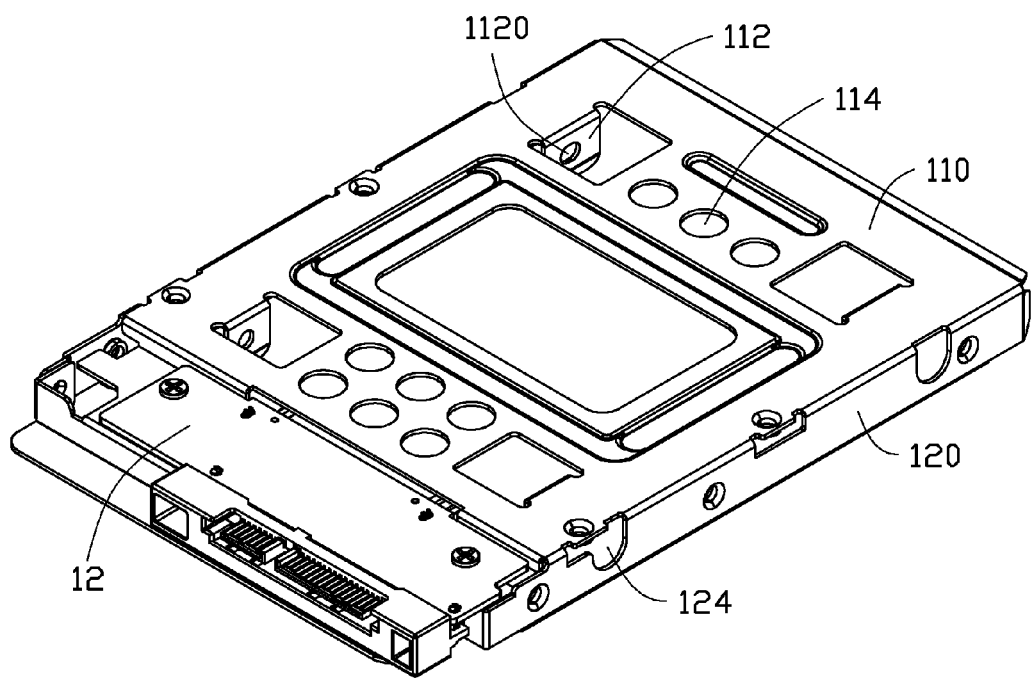
FIG. 2 is an isometric view of the data storage device cage of FIG. 1, but showing the data storage device cage inverted.

Referring to FIGS. 1 and 2, a data storage device cage 100 in accordance with an embodiment includes a main body 11 and an electrical connector 12 attached on the main body 11.

Figure 3:
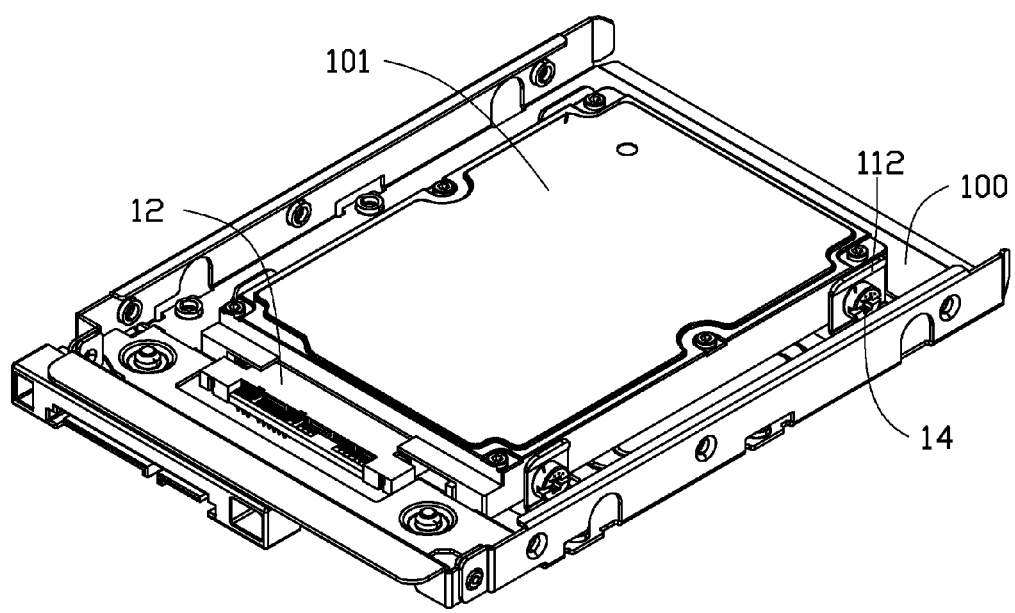
FIG. 3 is similar to FIG. 1, but showing a data storage device assembled in the data storage device cage.

The main body 11 includes a rectangular flat plate 110, and two side plates 120 respectively extending upward from opposite edges of the flat plate 110. The electrical connector 12 is positioned between the two side plates 120, and connects to one end of the flat plate 110 by common fasteners 13 (such as screws). The electrical connector 12 includes a first interface 121, and a second interface 122 electrically connected with the first interface 121. The first interface 121 is located in the main body 11 to directly connect a data storage device 101 (as shown in FIG. 3), and the second interface 122 electrically connects to an exterior device (such as a printed circuit board, not shown). The data storage device 101 can for example be a hard disk drive (HDD).

The flat plate 110 forms at least two tabs 112 opposite to each other, as one or more pairs of tabs 112. For each pair of tabs 112 of the at least two tabs 112, the tabs 112 are respectively contiguous with the two side plates 120, but offset inward from the two side plates 120. Each tab 112 extends perpendicularly upward from the flat plate 110, and a through hole 1120 is defined in the tab 112. In the present embodiment, the flat plate 110 has four tabs 112 respectively located adjacent to four corners thereof. Referring to FIG. 3, the tabs 112 hold the data storage device 101 on the flat plate 110 securely, with fasteners 14 such as screws extending through the through holes 1120 to engage in the data storage device 101. With such arrangement, a stable connection between the data storage device 101 and the tabs 112 of the data storage device cage 100 can be maintained, even when the data storage device cage 100 is dropped or suffers shock.

Furthermore, the flat plate 110 defines a number of ventilating holes 114 between the two opposite tabs 112 of each pair of tabs 112. The ventilating holes 114 allow airflow, such that the heat-dissipation efficiency of the data storage device cage 100 can be improved.

The two opposite side plates 120 each define two through holes 124, respectively corresponding to the contiguous tabs 112. The through holes 124 allow the fasteners 14 to pass therethrough, so that the fasteners 14 can be engaged with the tabs 112 and the data storage device 101.

In the present embodiment, the main body 11 is manufactured integrally as one monolithic piece by a punching process, instead of the conventional die-casting process, to more efficiently mass-produce the data storage device cage 100. The main body 11 is made of normal low-cost material, such as iron. In addition, the flat plate 110 and the side plates 120 of the main body 11 are simple in structure. Therefore, the data storage device cage 100 has a simple construction and a small volume.

Figure 4:
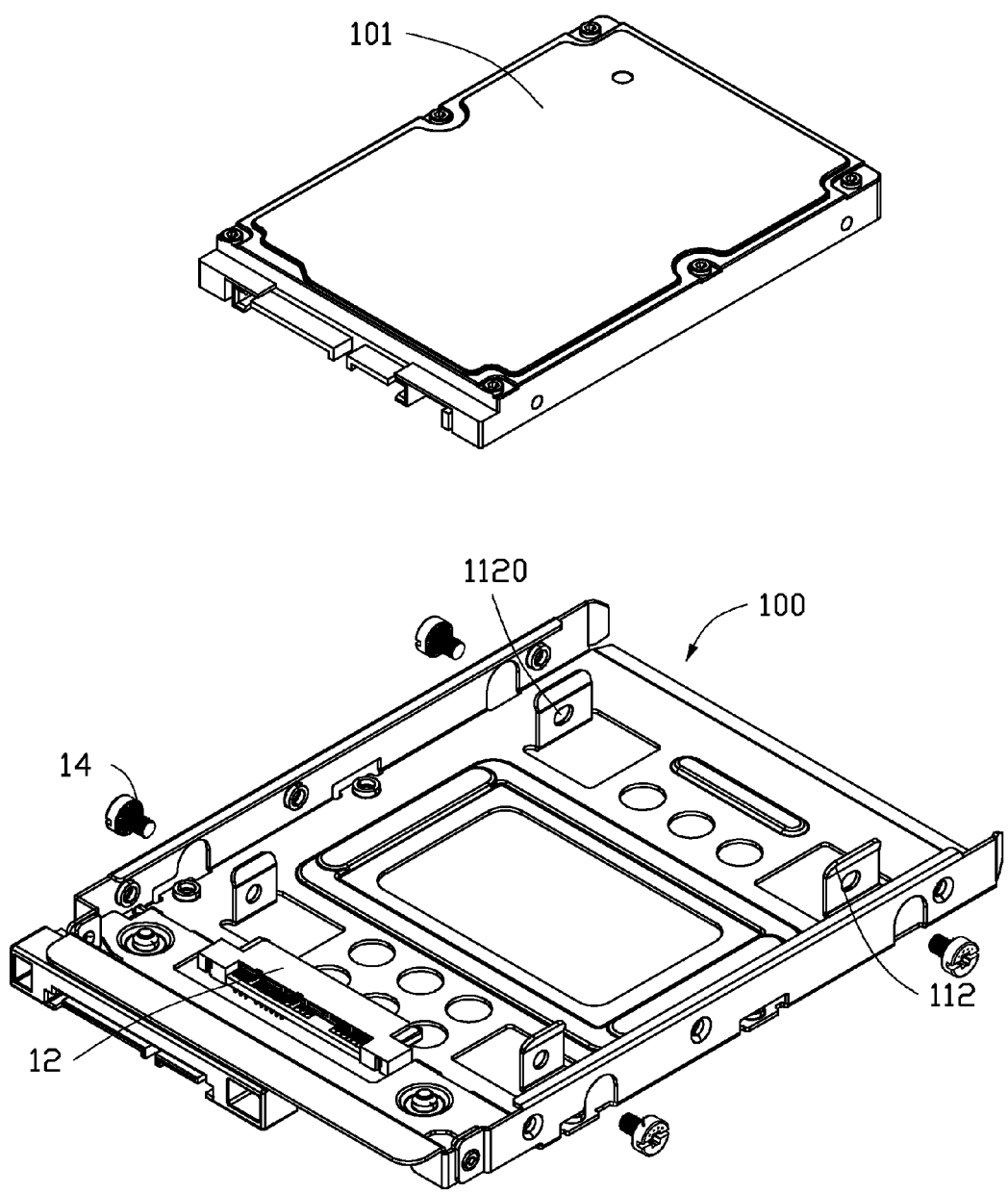
FIG. 4 is a disassembled view of the data storage device cage and the data storage device of FIG. 3.

Referring also to FIG. 4, the fasteners 14 respectively pass through the through holes 124 of the side plates 120 and the through holes 1120 of the tabs 112 to be fixed into the data storage device 101. In this way, the data storage device 101 is received in the data storage device cage 100 and fixed between the pairs of opposite tabs 112. A stable connection between the data storage device 101 and the data storage device cage 100 can be achieved. In further or alternative embodiments, other fasteners such as elastic elements can be used in cooperation with the tabs 112 of the flat plate 110 to hold and secure the data storage device 101 in position.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A data storage device cage comprising:
   a main body comprising a rectangular flat plate and two side plates respectively extending upward from opposite edges of the flat plate, the flat plate comprising at least a pair of tabs opposite to each other, and the at least two tabs being respectively contiguous with but offset inward from the two side plates and positioned to cooperatively hold a data storage device therebetween; and
   an electrical connector positioned on the main body between the two side plates for electrically connecting the data storage device to an external device.

2. The data storage device cage of claim 1, wherein each of the at least two tabs extends substantially perpendicularly upward from the flat plate.

3. The data storage device cage of claim 1, wherein a through hole is defined in each of the two tabs, for fasteners to extend therethrough and fix to the data storage device to the tabs.

4. The data storage device cage of claim 1, wherein the at least a pair of tabs comprises two pairs of tabs, and the four tabs are respectively located adjacent to four corners of the flat plate.

5. The data storage device cage of claim 1, wherein the flat plate defines a plurality of through holes between the at least two tabs for airflow.

6. The data storage device cage of claim 1, wherein the two opposite side plates each define a hole corresponding to one of the tabs.

7. The data storage device cage of claim 1, wherein the main body is a monolithic piece.

8. The data storage device cage of claim 1, wherein the main body is made of iron.

9. A data storage module, comprising:
a data storage device;
a cage comprising a flat plate and two tabs extending substantially perpendicularly from the flat plate, a space being defined over the flat plate between the two tabs and accommodating the data storage device, the two tabs each defining a through hole; and
two fasteners respectively extending through the through holes of the two tabs and engaged with the data storage device thereby fixing the data storage device to the tabs of the cage.

10. The data storage module of claim 9, wherein the two tabs are located adjacent to two opposite lateral edges of the flat plate.

11. The data storage module of claim 10, wherein the cage further comprising two side plates extending perpendicularly out from the two opposite lateral edges of the flat plate, the two tabs being located between the two side plates.

12. The data storage module of claim 11, wherein each of the two side plates defines a through hole corresponding to the through hole of the corresponding tab.

13. The data storage module of claim 11, wherein the flat plate, the side plates and the tabs are integrally formed as one monolithic piece.

14. The data storage module of claim 9, wherein a plurality of ventilating holes is defined in the flat plate, the ventilating holes being located between the two tabs.

15. The data storage module of claim 9, further comprising an electrical connector disposed on the flat plate and electrically connecting to the data storage device.

16. A cage for holding a data storage device, the cage comprising:
a flat plate for supporting the data storage device thereon; and
two tabs extending substantially perpendicularly from the flat plate, a space being defined over the flat plate between the two tabs for accommodating the data storage device, the two tabs each defining a through hole for a fastener to extend through and engage with the tab and the data storage device.

17. The cage of claim 16, further comprising two side plates extending perpendicularly out from the two opposite lateral edges of the flat plate, the two tabs being located between the two side plates.

18. The cage of claim 17, wherein the flat plate, the side plates and the tabs are integrally formed as one monolithic piece.

19. The cage of claim 16, wherein a plurality of ventilating holes is defined in the flat plate, the ventilating holes being located between the two tabs.

20. The cage of claim 16, further comprising an electrical connector disposed on the flat plate and electrically connecting to the data storage device.

* * * * *